Nov. 14, 1967  P. BAQUE ET AL  3,352,004

PROCESS FOR CLADDING URANIUM RODS

Filed July 31, 1964

INVENTORS
PIERRE BAQUE
RAYMOND DARRAS
PHILIPPE KOCH

BY Bacon & Thomas
ATTORNEYS 3,352,004
PROCESS FOR CLADDING URANIUM RODS
Pierre Baque, Viry-Chatillon, Raymond Darras, Versailles, and Philippe Koch, Marly-le-Roi, France, assignors to Commissariat à l'Energie Atomique, Paris, France
Filed July 31, 1964, Ser. No. 386,529
Claims priority, application France, Aug. 9, 1963, 944,375; June 27, 1964, 979,201
8 Claims. (Cl. 29—474.3)

The present invention relates to processes for cladding uranium rods by means of a metallic deposit, the products obtained by the application of said processes, and has for its object a process for the formation of an adherent metal deposit, without either cracks or fissures, on the surface of a rod of this type.

Uranium metal, or low alloy uranium metal, whether enriched or not, is widely employed as fuel material in heterogeneous nuclear reactors. In particular, non-enriched uranium is employed as fuel in graphite-moderated reactors which are cooled by carbon dioxide gas, usually in the form of full or hollow rods which are encased in a can of light alloy which is intended to protect uranium against oxidation. However, if such a can should burst at the temperature of operation of the reactor, the rod is consequently subjected to violent chemical attack, especially if the carbon dioxide gas is not absolutely free of oxygen and water vapor and, as a further consequence, the fission products escape into the cooling circuit.

When the fuel elements ordinarily employed which consist of a uranium metal base are subjected to irradiation which exceeds a certain threshold of the order of 1,000 mwd./t. in the vicinity of 500° C., there are observed certain physical phenomena and in particular diffusion through the can of plutonium which is formed as a result of irradiation of Uranium 238; the plutonium undergoes fission outside the can and the fission products give rise to highly troublesome contamination of the corresponding fuel channel.

Attempts have been made to cover the uranium rods with a metal deposit which is intended to retard the attacking action on uranium by the cooling fluid in the event of bursting of a can and prevent diffusion of plutonium and/or its diffusion products which are formed at the time of irradiation of the uranium rod. Among other processes, there has been employed the vaporization in vacuo of a metal such as magnesium, the diffusion of the metal in uranium in the solid state, and so forth. None of these methods has proved fully satisfactory up to the present time, either with respect to the properties of the layer or with respect to the consequential effect of the treatment on uranium. The layer must withstand oxidation in the heat-transporting fluid (usually carbon dioxide gas) and must be sufficiently adherent to withstand handling operations to which the rod is subjected. The cladding metal must not continue to diffuse into the uranium to any appreciable degree at operating temperatures which attain 400 to 500° C. The thermal treatment adopted must not require a temperature such that the rod is deformed or that the uranium structure is thereby impaired. Finally, the cladding metal must be compatible with the metal of which the fuel can is formed.

The present invention is concerned with the basic concept of a cladding process which satisfies the conditions noted above more effectively than has hitherto been achieved by the processes of the prior art. To this end, this invention proposes a method of cladding by solid diffusion which consists in pickling the rod, in applying a thin strip of cladding metal on a uranium rod, in heating said rod as thus covered with said strip which is maintained applied thereon, said heating being performed either in a vacuum or in an inert atmosphere at a temperature and for a period of time which are sufficient to cause the diffusion of said cladding metal to a predetermined depth within the uranium. Among the cladding metals can be mentioned copper, zirconium, aluminum, niobium and nickel, all of which are of particular value in providing protection against oxidation, against the diffusion of plutonium and/or its fission products which are formed at the time of irradiation of the uranium rod.

This process is particularly well suited to the cladding of rods having the shape of full cylinders but, subject to the use of a more complex material, can nevertheless be applied to different shapes and configurations.

A clearer understanding of the invention will be gained from a perusal of the following description, reference being made to the accompanying drawings, in which.

The invention is applicable to rods of uranium metal or of low alloy uranium. Said rods are first of all machined in the shape of a cylinder then carefully cleaned. This preliminary treatment can consist of a degreasing treatment in a bath of acetone followed by anodic pickling (in a 10% aqueous solution of nitric acid, for example) which facilitates the subsequent diffusion process. The rod is then rinsed over a long period of time in a very dilute acid solution, then in absolute alcohol.

The rod which is thus prepared must be either subjected to a protective treatment or immediately subjected to the cladding process; in fact, uranium readily oxidizes in air and, in addition, the anodic polishing treatment may leave on the surface a hydroxide film which would result in a black coating or pellicle beneath the cladding if immediate processing were not performed.

When the second solution is adopted, the uranium rod which has been pickled and rinsed is rolled in a thin foil (a few hundredths of a millimeter in thickness) of the cladding metal which has been previously pickled.

The foil is turned back at the two ends of the rod in such manner as to surround this latter entirely, then applied against the rod; the assembly is placed in a secondary vacuum, heated to between 350°–400° C. for several hours in order to ensure the elimination of gas, then brought to a higher temperature at which the diffusion process takes place.

A number of metals or alloys can be employed; the best results are obtained in the case of zirconium. Favorable results are also obtained in the case of copper, whether employed alone or in combination with zirconium. This combination can also be carried into effect either by making use of strips of zirconium-copper alloy or by forming first a layer of zirconium, then a layer of copper, or conversely.

Figure 2:
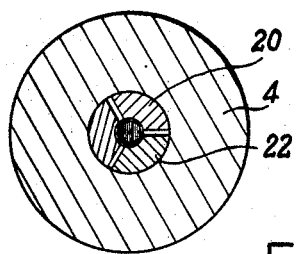
FIG. 2 is a sectional view taken along the line II—II of FIG. 1.
Figure 1:
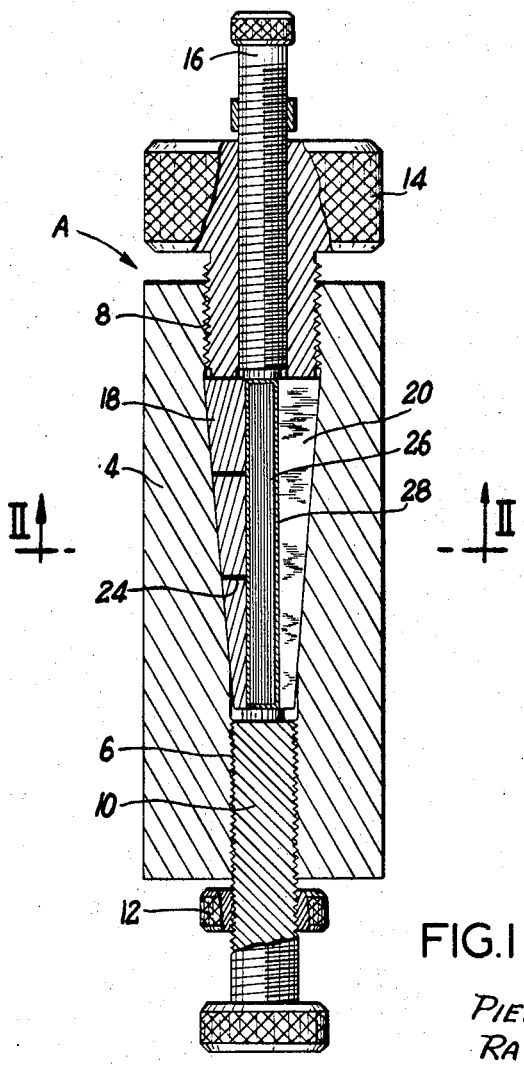
FIG. 1 is a diagrammatic sectional view taken along a plane which passes through the axis, of an apparatus for the practical application of a process which constitutes one of the possible modes of operation of the invention and which is given solely by way of example without implied limitation.

The process can be carried into practice in a number of different conventional appliances. However, it is an advantage to make use of the apparatus A which is illustrated in FIGS. 1 and 2.

The apparatus A consists of a steel case 4 forming a smooth-walled longitudinal housing of frusto-conical shape which opens into two threaded passages 6 and 8. There is fitted in the passage 6 a flat-ended clamping screw 10 fitted with a lock-nut 12; the passage 8 is in turn fitted with a plug cap 14 in which is screwed a screw 16.

There are disposed within the housing a series of clamping wedges having the shape of sectors of truncated cones, the conicity of which is equal to that of the housing. The apparatus which is illustrated consists of three wedges 18, 20 and 22, each of which occupies a sector of 120°.

There are advantageously formed in the wedges 18, 20 and 22 a series of passages such as the passage 24 which are intended to facilitate the degassing of the rod when the apparatus A is placed in a vacuum and heated.

The operation of the process according to the invention in the apparatus which is shown in FIGS. 1 and 2 is performed as follows: the pickled and rinsed rod 26 is covered with a thin foil 28 which is rolled round the rod then turned back at the two ends of the rod. The screw 16 is removed from the apparatus, the plug cap 14 is moved back by unscrewing and the screw 10 is screwed home so as to move the wedges apart. The rod which is covered with the metal foil is inserted between the wedges. Thereupon, the screw 16 is replaced and the wedges are forcibly applied against the rod by screwing down the plug cap 14 and the screw 16 in conjunction with a correlative withdrawal of the screw 10.

The combined assembly of the apparatus A and of the rod is placed within a furnace and a secondary vacuum is rapidly created followed by a temperature increase to 350–400° C. This temperature is maintained for a period of several hours in order to effect the degassing of the rod. Once this process has been completed, the temperature is increased to the value which is necessary to produce a sufficiently rapid diffusion which is maintained until an adherent layer is formed which has the requisite thickness.

*Examples*

*Example I.*—In order to form a zirconium cladding on a full rod 6 millimeters in diameter and 40 millimeters in length, use was made of a zirconium foil having a thickness of a few hundredths of a millimeter which was pickled in a bath of nitro-hydrofluoric acid then rinsed in absolute alcohol. This foil was then applied on the rod immediately after pickling and rinsing of this latter, the assembly was then immediately transferred into the apparatus which was placed in the furnace. The cladding operation proper successively entailed a degassing process for a period of 5 to 6 hours between 350 and 400° in a secondary vacuum of $10^{-5}$ to $10^{-6}$ millimeters of mercury, followed by heating to a temperature comprised between 600° and 800° C., again in a secondary vacuum.

It is essential to ensure that the removal of gas is complete before increasing the temperature with a view to initiating the diffusion. The said diffusion appears to be optimum at approximately 700° C., the time of the operation being accordingly of the order of 100 hours.

Under a magnification of the order of 650×, the product which was obtained after 84 hours at 700° C. shows that the uranium is covered with an adherent and compact layer of zirconium having a thickness of the order of 10 microns. There can be seen between the surface layer of zirconium and the uranium an additional phase which corresponds to the intermetallic bond.

The rod which was thus obtained was subjected to comparative oxidation tests at 500° C. in dry carbon dioxide gas over periods of time which varied between 48 and 96 hours. The weight gain was reduced to a fraction comprised between 15 and 20% of that of an unclad uranium rod. Moreover, the quantity of powdery oxide formed was much smaller, the surface retained a metallic appearance and did not scale off.

*Example II.*—In order to form a cladding of copper, the operation was carried out in a similar manner but at a temperature of the order of 650° C. during the diffusion period. The results, which were less favorable than in the case of zirconium, were also positive.

The copper cladding can also be carried out above the zirconium layer, for example with a view to creating subsequently a metallurgical bond with the can. A cladding can also be formed by means of strips of zirconium-base alloy containing a low percentage of copper.

One alternative form of the process described, which entails a modification of the apparatus which is illustrated in FIGS. 1 and 2, consists in carrying out selective heating of the periphery of the rod by means of a high-frequency current. In this manner, the temperature rise of the entire rod is prevented together with attendant dangers of deformation.

The barrier which is formed by the cladding layer protects the rod without subsequently creating any metallurgical bond with the constituent of the can (usually low-alloy magnesium in the case of reactor fuel elements cooled by circulation of carbon dioxide gas). Accordingly, in the event of a burst occurring, the can does not draw away the cladding which continues to protect the uranium and prevents violent attacking action by the carbon dioxide gas. The cladding can be formed on rods of various shapes, whether full or tubular.

*Example III.*—A cladding of aluminum was formed on a full cylindrical rod of uranium 6 millimeters in diameter and 40 millimeters in length by employing aluminum foil a few hundredths of a millimeter in thickness which was pickled in a sulfo-phosphoric acid bath then rinsed in absolute alcohol. Said foil was applied against the rod immediately after pickling and rinsing of this latter and the combined assembly was immediately transferred into the apparatus which was placed in a furnace. The cladding operation proper successively entailed a degassing process between 350 and 400° C. for a period of 5 to 6 hours in a vacuum of $10^{-5}$ to $10^{-6}$ millimeters of mercury, followed by heating to a temperature of approximately 600° C., again in a vacuum, for a period of approximately 100 hours.

A thickness of cladding metal was obtained having a thickness of the order of 10 microns. The rod thus obtained was subjected to comparative oxidation tests in dry carbon dioxide gas at 500° C. for a period of over 130 hours. The weight gain was reduced to a fraction comprised between 10 and 30% of that of the unclad uranium rod. The ratio $k$ of the weight of powder detached from each rod (clad and unclad) was equal to 0.02, which shows that the reference rod of unclad uranium releases a quantity of powder which is considerably greater than that which is released by the clad rod; moreover, the surface retains its metallic appearance and does not scale off.

*Example IV.*—A cladding of niobium was formed in the same manner at a diffusion temperature of the order of 750° C. for a period of time exceeding 100 hours. The rod which was clad with a layer of niobium was subjected to comparative oxidation tests at 500° C. in dry carbon dioxide gas for a period of time comprised between 100 and 150 hours. The weight gain was reduced to a fraction comprised between 30% and 65% of that of an unclad uranium rod.

It will be apparent that the invention is not limited to the modes of practical application of the process which have been described and it must be understood that the scope of this patent extends to any alternative form which remains within the definition of equivalent means, as well as to any product having the characteristics which are obtained as a result of the application of said process.

What we claim is:

1. A process for cladding uranium rods which comprises
    (a) applying a thin strip of a cladding metal having a thickness of a few hundredths of a millimeter and selected from the group consisting of zirconium, copper, aluminum, niobium and nickel on uranium rod so as to cover said rod;
    (b) heating said covered rod at a temperature of from 350° to 400° C. in a vacuum of from $10^{-5}$ to $10^{-6}$ millimeters of mercury for a time sufficient to degas the covered rod; and (c) heating said covered rod at a temperature of from 600° to 850° C. in a vacuum of from $10^{-5}$ to $10^{-6}$ millimeters of mercury for a time sufficient to produce diffusion of said cladding metal to a predetermined depth within said uranium rod.

2. Process in accordance with claim 1 wherein the heating of the rod during the degassing and diffusion stages is carried out by means of a high-frequency current.

3. Process in accordance with claim 1 wherein the cladding metal is zirconium and the diffusion stage of step (c) consists in heating to a temperature comprised between 650° and 850° C. for a period of approximately one hundred hours.

4. Process in accordance with claim 1, wherein the cladding metal is copper and the diffusion stage consists in heating to the vicinity of 650° C. for a period of approximately one hundred hours.

5. Process in accordance with claim 1 wherein the cladding metal is aluminum and the diffusion stage consists in heating to a temperature comprised between 600° and 800° C. for a period of approximately one hundred hours.

6. Process in accordance with claim 1 wherein the cladding metal is niobium and the diffusion stage consists in heating to the vicinity of 750° C. for a period of approximately one hundred hours.

7. Process in accordance with claim 1, wherein the cladding metal is nickel and the diffusion stage consists in heating between 600° and 800° C. for a period of approximately one hundred hours.

8. A process according to claim 1 which comprises the additional steps after step (c) of cooling the cladded uranium rod and placing said rod in a metallic can.

References Cited

UNITED STATES PATENTS

| | | | |
|---|---|---|---|
| 2,820,751 | 1/1958 | Saller | 29—504 X |
| 2,985,571 | 5/1961 | Binstock et al. | 29—504 X |
| 3,124,875 | 3/1964 | Takahashi et al. | 29—473.3 |
| 3,139,681 | 7/1964 | Goslee et al. | 29—474.3 |
| 3,158,732 | 11/1964 | Kazakov | 29—498 X |
| 3,235,958 | 2/1966 | Gauthron | 29—498 X |

FOREIGN PATENTS 859,503   1/1961   Great Britain.

JOHN F. CAMPBELL, *Primary Examiner.*

L. J. WESTFALL, *Assistant Examiner.*